Oct. 14, 1952  J. STONE, 4TH  2,614,242
REACTOR-CONTROLLED ELECTRONIC CIRCUIT
Filed Nov. 4, 1948
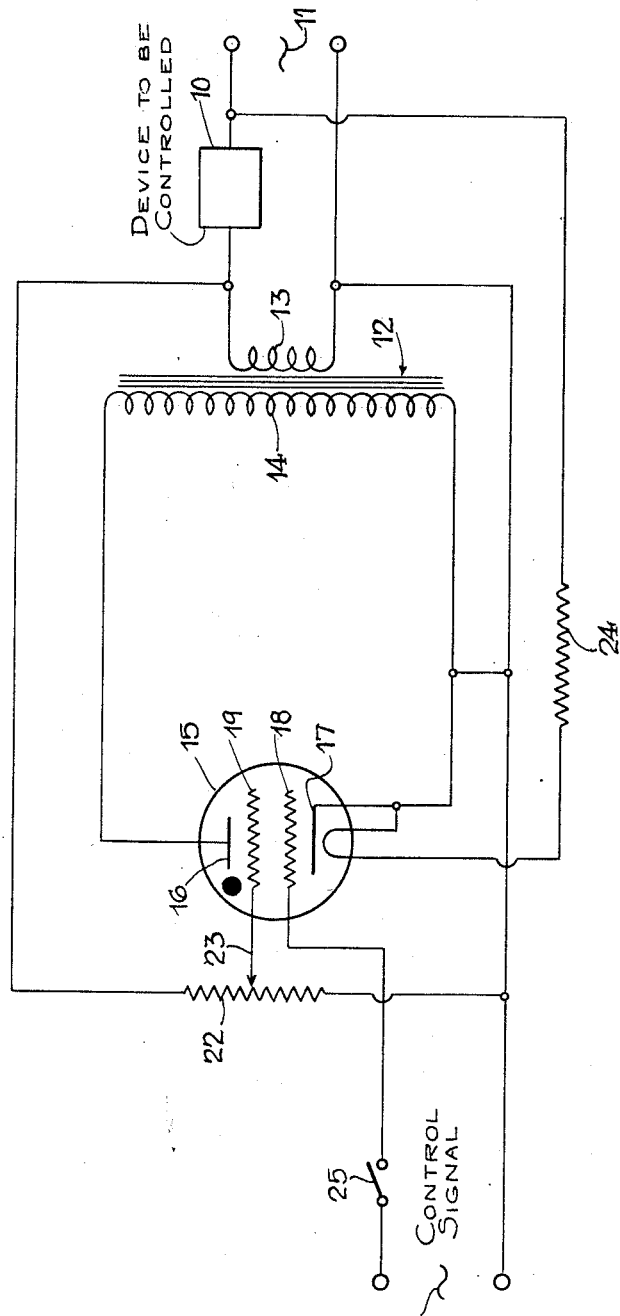
INVENTOR.
JOHN STONE.4TH.
BY Ward, Crosby & Neal
ATTORNEYS.

Patented Oct. 14, 1952

2,614,242

UNITED STATES PATENT OFFICE 2,614,242

REACTOR-CONTROLLED ELECTRONIC CIRCUIT

John Stone, 4th, Havertown, Pa., assignor to Warren Webster & Company, Camden, N. J., a corporation of New Jersey Application November 4, 1948, Serial No. 58,275

6 Claims. (Cl. 323—66)

This invention relates generally to current control systems and more particularly to an electronic reactor circuit for controlling the current flow in an alternating current load.

In control systems of this type hitherto known or used for controlling the current flow in an alternating current load, it has been the general practice to vary the reactance of a reactor serially connected with the load to be controlled by causing a saturating current to flow through the reactor. This saturating current is provided by a thermionic valve whose operating plate potential is supplied by the voltage drop across the reactor, the biasing potential for the valve being supplied from an external source. When it is desired to saturate the reactor and thereby increase the flow of current through the load, the biasing potential of the valve is varied to cause the valve to conduct. This practice is not completely satisfactory, however, for the reason that since the operating plate potential for the valve is supplied by the voltage drop across the reactor, the operating plate potential will decrease in value in accordance with the decrease in the voltage drop across the reactor during saturation thereof. A fixed bias would render the valve oscillating until the control signal had reached a magnitude greater than the bias potential. Therefore, in order to maintain the valve in a conducting condition, it is necessary to vary the biasing potential of the valve. Further, even though it is not desired to vary the current flow in the load, it is necessary that a biasing potential be supplied from an external source in order to prevent the valve from continuously conducting. Other arrangements have been used in which an independent and auxiliary current supply is provided between the thermionic valve and the reactor to continuously provide the desired saturating current for the reactor. These arrangements, however, are more complicated and hence more expensive because of the added feature of the auxiliary current supply.

It, therefore, is the object of the present invention to provide a new and improved electronic reactor circuit for controlling the current flow in an alternating current load and in which a saturating current is continuously caused to flow through the reactor in response to a signal voltage of a constant value, no saturating current being caused to flow when no signal voltage is applied, thereby eliminating the requirement of an independent and auxiliary current supply for the reactor.

Additional features, objects and advantages of the invention will become more clearly apparent from the detailed description given below and taken in connection with the accompanying drawing which forms a part of the specification.

The single figure of the drawing is a schematic diagram of the control circuit of the present invention according to the preferred embodiment thereof.

Referring now to the figure of the drawing, 10 generally designates an alternating curren load, the current flow through which is to be controlled. The load may be of any character, such, for example, as a lighting system comprising a series of electric lamps or heating apparatus adapted to be controlled by external temperature changes. A suitable A. C. source 11 of energy is provided for the load 10 and is serially connected therewith. An iron core transformer 12 is utilized as the reactor element of my control circuit and comprises a primary winding 13 serially connected with the load 10 and A. C. source 11 and a secondary winding 14 of substantially greater number of turns than the primary winding to provide a step-up ratio therebetween such that a smaller current flow through the secondary winding will generate the required ampere-turns to saturate the reactor.

A space discharge device 15 is provided and preferably is of the type referred to in the trade as Thyratron and comprises an anode 16, cathode 17, and a pair of control electrodes including control grid 18 and screen grid 19. The secondary winding 14 is connected across anode 16 and cathode 17 of the thyratron. Resistor 24 is connected serially with the heater of the valve across the power source 11 to provide the proper current flow in the heater. The control grid 18 of the thyratron is connected to a suitable A. C. source 21 adapted to provide a continuous signal voltage thereto of proper phase and magnitude to cause the tube to conduct when switch 25 is closed.

With this arrangement, as a signal voltage of proper phase and magnitude is applied to the control grid 18, the thyratron 15 is caused to conduct whereby a saturating current will flow through the secondary winding 14 of the transformer to vary the reactance thereof. With this saturating current flowing through the secondary winding, the impedance of the load circuit comprising the primary winding 13 and load 10 will decrease and the current flow therein will increase. When the transformer becomes saturated, the voltage drop across the primary winding thereof becomes approximately one third that of the original value thereof and hence, the voltage drop across the secondary winding of the transformer decreases in the same proportion.

To ensure that the tube will be maintained in a maximum conducting condition, it is necessary to provide a grid voltage which will vary in the same proportion as the voltage drop across the secondary winding of the transformer, the grid voltage being maintained 180° out of phase with the anode to cathode voltage of the tube. I have accomplished this by connecting the power side of the primary winding to the cathode 17. A potentiometer 22 is connected across the primary winding with the arm 23 of the potentiometer being connected to the screen grid 19 of the tube. Thus, the screen grid of the tube acts as the biasing grid thereof and the control grid 18 is adapted to receive the signal voltage. The biasing voltage on the screen grid may be adjusted by means of the potentiometer 22 to provide the required sensitivity in the circuit. The biasing voltage on screen grid 19 now will vary directly in amplitude with the voltage drop across the secondary winding of the transformer and will remain in proper phase relation with the anode to cathode voltage of the tube, whereby the tube is maintained in a maximum conducting condition in response to the application of a constant signal voltage to the control grid. It will be noted that with a zero signal applied to the control grid, the tube is maintained non-conductive by the biasing voltage applied to the screen grid thereof.

While I have described my invention in detail with particular reference to the preferred embodiment thereof, it will be obvious to those skilled in the art to which my invention pertains after understanding my invention, that further modifications and changes may be made therein without departing from the spirit and scope of my invention as defined by the claims appended hereto.

What I claim as new and desire to be secured by Letters Patent of the United States is:

1. A control system comprising an alternating current load circuit, a transformer having primary and secondary windings, said primary winding being included in said load circuit and said secondary winding being adapted when current is flowing therethrough to magnetically saturate said transformer thereby to decrease the impedance of and increase the flow of current in the load circuit, and a gaseous space discharge device having an anode, cathode, control grid and screen grid, said secondary winding of said transformer being connected across the anode and cathode of said space discharge device to apply an operating potential therebetween, said control grid being responsive to a signal voltage of constant value to render said space discharge device conducting and cause a saturating current to flow in said secondary winding of said transformer, said primary winding of the transformer being connected to said screen grid of said space discharge device to provide a biasing potential therefor which varies directly with the operating potential applied between said anode and cathode whereby the space discharge device is maintained conductive at a predetermined level when a constant signal voltage is applied to said control grid.

2. A control system comprising an alternating current load circuit, a reactor connected in series with said circuit and adapted when saturated to decrease the impedance of the reactor and increase the current flow in said load circuit, the voltage drop across said reactor decreasing in value as it becomes saturated, a thermionic valve having a control electrode responsive to a signal voltage for varying the flow of current therethrough, means for coupling said valve to said reactor and means for coupling said control electrode to a point electrically intermediate a terminal of said reactor and a terminal of said load circuit.

3. A control system comprising a network including a load circuit and a saturable reactor connected to said load circuit for controlling the current therein, a gas tube having a control electrode, means for coupling said tube to said reactor for controlling the saturation thereof and means for coupling said control electrode to a point in said network electrically intermediate the ends thereof.

4. A control system comprising a network including a load circuit and a saturable reactor connected to said circuit for controlling the current therein, a gas tube having an anode, a cathode and a control electrode, means for coupling said anode and cathode to said reactor for controlling the saturation thereof and for supplying a voltage to said anode and cathode, and means for supplying a voltage to said control electrode of sufficient magnitude to prevent conduction of said tube in the absence of other voltages applied to said tube, said last-mentioned voltage being controlled in amplitude in accordance with the current in said load circuit.

5. A control system comprising an alternating current load circuit, a transformer having primary and secondary windings, said primary winding being included in said load circuit and said secondary winding being adapted when current is flowing therethrough to magnetically saturate said transformer thereby to decrease the impedance of the transformer and to increase the flow of current in the load circuit, a thermionic valve having an anode, a cathode and a control electrode, means for connecting said anode and cathode to said secondary winding, whereby the saturation of said transformer is controlled by the current in said tube, and an automatic biasing circuit connected between said control electrode and a point in said load circuit whose potential is controlled by the current in said load circuit.

6. A control system for controlling the alternating current through a load from a source of alternating current, comprising a saturable transformer having a core, a primary winding adapted to be connected in series with said source and said load and a secondary winding adapted when current is flowing therethrough to magnetically saturate said core, a gas tube having an anode, a cathode, a control grid and a screen grid, means connecting said anode and said cathode to different points on said secondary winding, means for connecting said control grid to a source of control potential and means connecting said screen grid to a point in said system whose voltage is out of phase with respect to the voltage between said anode and said cathode and whose voltage decreases in amplitude with respect to the cathode with increases in amplitude of said alternating current through said load.

JOHN STONE, 4TH.

REFERENCES CITED

The following references are of record in the file of this patent:

UNITED STATES PATENTS

| Number | Name | Date |
|---|---|---|
| 1,986,112 | Logan | Jan. 1, 1935 |
| 2,001,837 | Craig | May 21, 1935 |
| 2,054,496 | Craig | Sept. 14, 1936 |
| 2,497,218 | Hart | Feb. 14, 1950 |